UNITED STATES PATENT OFFICE.

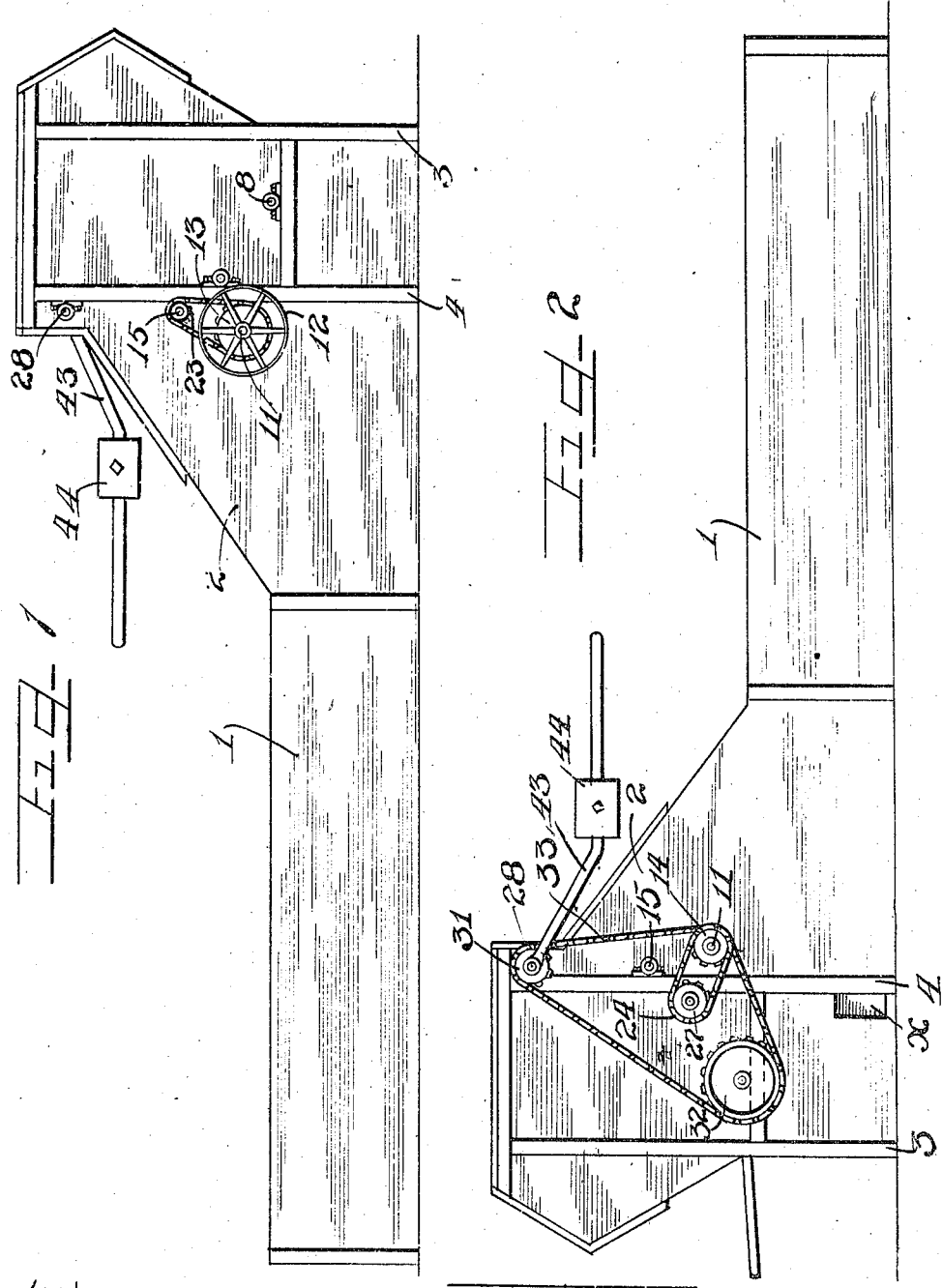

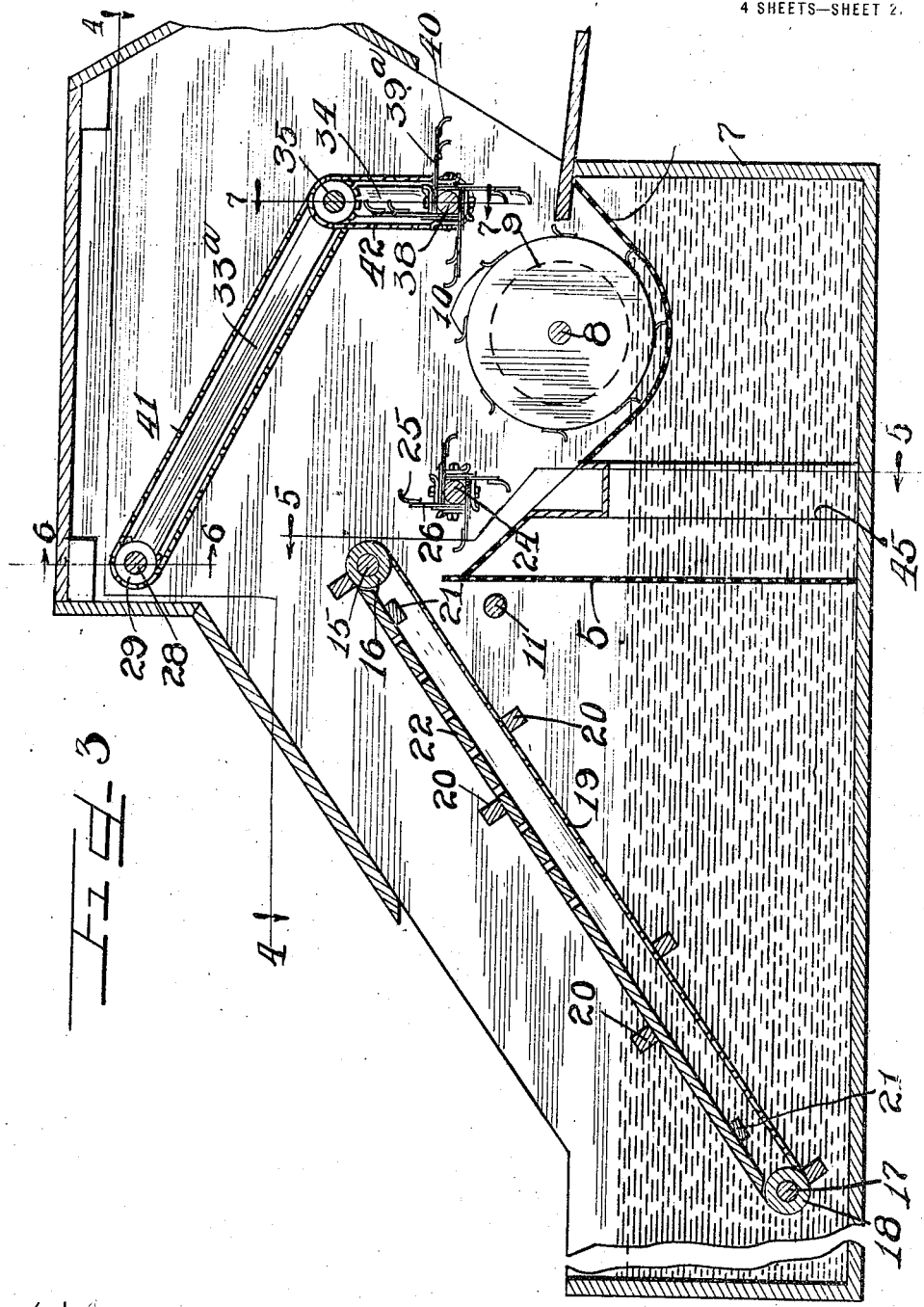

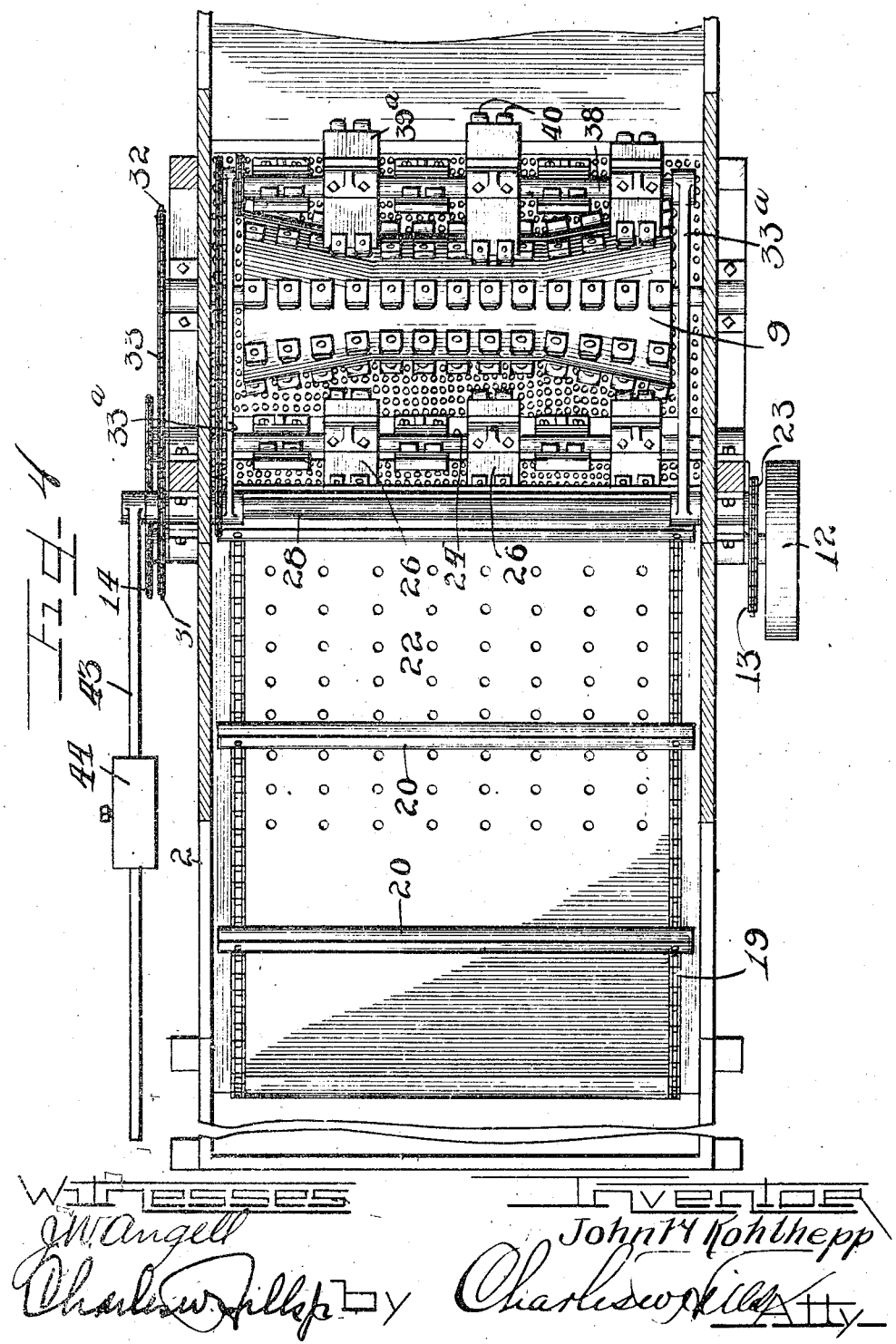

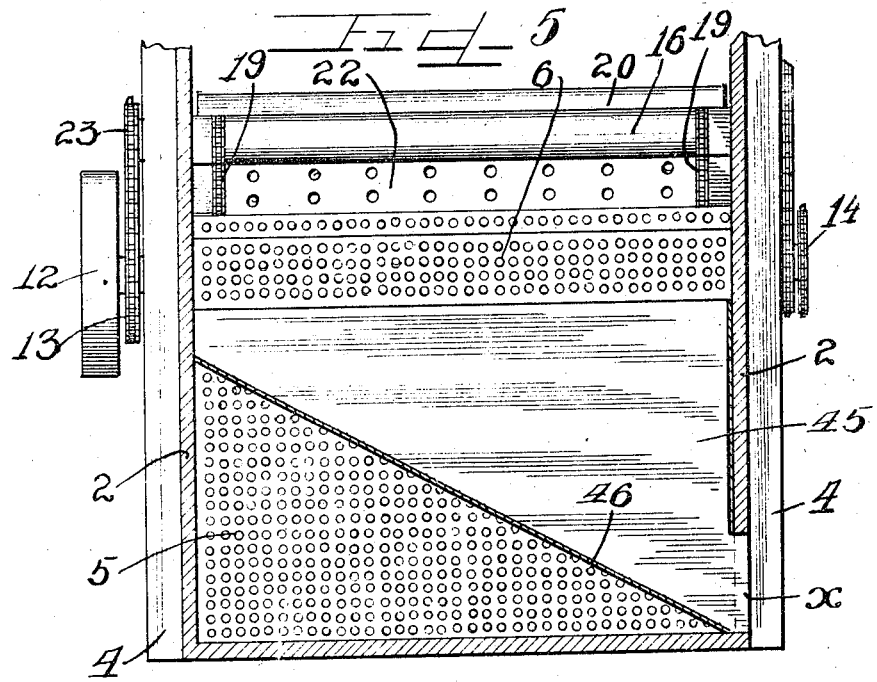
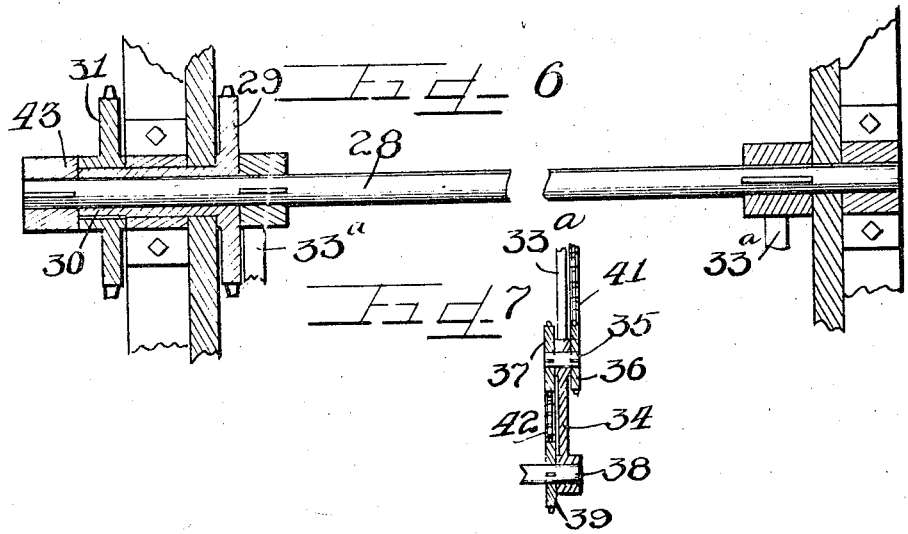

JOHN W. KOHLHEPP, OF CHICAGO, ILLINOIS, ASSIGNOR TO THE ALLBRIGHT-NELL COMPANY, A CORPORATION OF ILLINOIS.

HOG-SCRAPING MACHINE.

1,192,907.  Specification of Letters Patent.  Patented Aug. 1, 1916.

Application filed January 24, 1913. Serial No. 743,938.

*To all whom it may concern:*

Be it known that I, JOHN W. KOHLHEPP, a citizen of the United States, and a resident of the city of Chicago, in the county of Cook and State of Illinois, have invented certain new and useful Improvements in Hog-Scraping Machines; and I do hereby declare that the following is a full, clear, and exact description of the same, reference being had to the accompanying drawings, and to the numbers of reference marked thereon, which form a part of this specification.

This invention relates to hog scraping machines of that class adapted to be mounted upon, or constructed as a part of the scalding tank or trough:

It is an object of the invention to afford a device of the class described adapted to take the carcasses direct from the trough or tank, deliver the same to the dehairing and polishing mechanism, and eject the same after the operation is completed.

It is also an object of the invention to afford a construction wherein rotative scraping mechanisms act to retain the carcass therebetween, and rotate the same while dehairing the carcass, and to eject the carcass when the operation is completed, and to afford means in connection therewith for shifting one of the dehairing elements upwardly to permit ejection of the carcass.

It is a further object of the invention to afford a mechanism of the class described normally operating as a dehairing element, and which serves also for ejecting the carcass when the operation is completed.

It is also an object of the invention to afford a hog scraping and polishing machine adapted to be constructed on, or as a part of the scalding trough, and equipped with means whereby the hair and refuse removed from the carcass, are discharged to a compartment permitting ready removal from the machine while the machine is in operation.

The invention (in a preferred form) is illustrated in the drawings, and hereinafter more fully described.

In the drawings: Figure 1 is a side elevation of a machine embodying my invention. Fig. 2 is a view in elevation of the opposite side of the machine from that shown in Fig. 1. Fig. 3 is a fragmentary section partly broken away, taken along the inner wall looking away from the driving side of the machine. Fig. 4 is a fragmentary section on line 4—4 of Fig. 3. Fig. 5 is a fragmentary section on line 5—5 of Fig. 3. Fig. 6 is a fragmentary section on line 6—6 of Fig. 3. Fig. 7 is a fragmentary section on line 7—7 of Fig. 3.

As shown in the drawings: 1, indicates the scalding tank or trough, the side walls 2, of which at one end of the machine, are extended upwardly and rearwardly to afford the side walls for the scraping mechanism, and suitable posts 3 and 4, are provided on each side the machine at said end to afford the frame for the mechanism mounted thereon. As shown, a relatively high perforated wall 5, is provided in the scalding tank in advance of the scraping mechanism, and is of a height to extend well above the surface of the hot water in the tank.

An inclined or cylindrically concave floor 6, of perforated material, extends from the top of the perforated wall 5, downwardly well below the surface of the water in the relatively small compartment at the rear of the perforated wall, and then inclines upwardly to the top of the rear end wall 7, of the tank. Journaled transversely the machine on a suitable beam secured on the posts 3 and 4, is a shaft 8, and rigidly secured thereon is a drum 9, of relatively large diameter, provided upon its periphery with closely arranged scraping blades 10, which are arranged thereon longitudinally of the roll, as shown in Figs. 3 and 4, and comprise metallic blades having upwardly turned ends, and which are set close together in the length of the drum in each line thereof. Said drum is shown as of larger diameter at the ends than at the middle; in other words, the same tapers conically inwardly from each end to a central cylindric portion. The floor 6, conforms to the curvature of said drum, the outer ends of said drum as shown in Figs. 3 and 4, being at a sufficient distance therefrom to afford adequate clearance for the scraping blades.

Journaled on suitable bearings supported on the side walls of the machine in advance of the post 4, is a driving shaft 11, provided on one end thereof with a driving belt pulley 12, and a sprocket wheel 13, and at the other extremity is provided with a sprocket wheel 14. Journaled above said shaft and in suitable bearings on the post 4, is a shaft 15, which extends transversely the machine and rigidly secured on which is a roller or drum 16. A sprocket wheel is rigidly secured on said shaft 15, at each end of the roll 16, and adjacent each side wall of the machine.

A shaft 17, is journaled in the tank transversely thereof near the bottom of the same, and well in advance of the shaft 15, as shown in Figs. 3 and 4. A roll or drum 18, is provided on said shaft, corresponding with the roll or drum 16, on said upper shaft, and sprocket wheels are also provided at each end of said roll or drum corresponding with those on the shaft 15. Trained about said sprocket wheels on said shafts, are carrier chains 19, having angular bars 20, which extend transversely the machine, secured to each to afford means for conveying the carcasses from the tank. As shown, transverse bars 21, extend across the tank, engaged on the side walls thereof, and supported thereon with the upper surface thereof substantially at a tangent with the tops of the rolls 16 and 18, is a perforated floor 22, over which the bars 20, slide at the upper run of the carrier. As shown, a sprocket wheel 23, is provided on said shaft 15, in alinement with the sprocket wheel 13, before described, and about the same is trained a sprocket chain whereby the conveyer is actuated directly from the main driving shaft 11.

Journaled transversely the machine at the rear of the main driving shaft, and slightly above the same, is a shaft 24, having peripherally arranged scraping blades 25, thereon, and engaged therewith by means of short, stiff pieces of belting 26. Such connection between the blades and the shaft, may, however, be of other material to afford more or less resiliency, the object being to yieldingly engage the scraping blades on said shaft to permit the same to spring somewhat at the resistance encountered against the carcass, thus enabling the blades to conform to all parts of the surface of the carcass. As shown, a sprocket wheel 27, is provided on the end of said shaft 24, adjacent the sprocket wheel 14, on the shaft 11, and trained about said sprocket wheels, is a sprocket chain, whereby power is communicated thereto from the driving shaft 11, to rotate the same continuously and in a direction to cause the scraping blades to act upwardly upon the carcass, and to permit said shaft with the scraping blades thereon, to deliver the carcasses from the upper end of the conveyer thereover to the scraping drum or roll 9.

Journaled transversely at the top of the machine at the front side thereof, is a shaft 28, as shown more fully in Fig. 6. Journaled on said shaft at the inner side of one of the side walls, is a sprocket wheel 29, provided with an elongated hub 30, which extends rotatably through the bearing for the shaft at that side of the machine, and rigidly secured on the outer end of which is a sprocket wheel 31, and trained about said sprocket wheel 31, about a sprocket wheel 32, on the drum shaft, and about a driving sprocket wheel rigidly secured on the driving shaft 11, is a sprocket chain 33, which communicates the drive to the drum 9, and also to the sprocket wheels 31 and 29.

Rigidly secured on the shaft 28, adjacent the sprocket wheel 29, and adjacent the opposite side wall of the machine, are rearwardly and downwardly directed arms 33$^a$, of a length to extend inwardly and rearwardly over and past the scraper drum 9. Near their extremities, said arms are bent downwardly, as shown in Figs. 3 and 7, affording a downward extension 34.

Journaled at the bend between said arm 33$^a$, and extension 34, is a shaft 35, provided on each end thereof, with sprocket wheels 36 and 37 respectively. Journaled at the lower end of the extension 34, of said arms, and extending transversely the machine, is a shaft 38, having a sprocket wheel 39, thereon in alinement with the sprocket wheel 37, above the same on the shaft 35. Secured on said shaft 38, by means of flexible connections 39$^a$, similar to the flexible connections 26, before described, are scraping blades 40. A sprocket chain 41, is trained about the sprocket wheel 29, on the shaft 28, and about the sprocket wheel 36, on the shaft 35, and a sprocket chain 42, is trained about the sprocket wheels 37, on the shaft 35, and the sprocket wheel 39, on the shaft 38, thereby driving the shaft 38, in a direction to cause the scrapers to act inwardly and upwardly on the carcasses which are brought against the same by the rotation of the scraping drum 9, as shown in Fig. 3.

As shown, a lever 43, is rigidly secured on the end of the shaft 28, at the operating side of the machine, and extends into position to be easily reached by the operator, and is provided with a counterweight 44, adjustable thereon to partly counterbalance the weight of said arms 33, extensions 34, and mechanism supported thereon.

As shown, the floor 6, is provided with a relatively broad transverse slot well above the water line in the tank, and in advance of the scraping roll, and fitted therein and extending to the bottom of the tank is a tight receptacle 45, open at the top, and the bottom 46, of which inclines laterally to an opening at the bottom of said receptacle and through the side wall of the tank, as indicated at X, in Figs. 2 and 5. Any suitable packing may be used about said opening through the side wall to prevent leakage of water. The top of the receptacle opens through said slot in the concave floor 6, The operation is as follows: The scalded carcasses are presented to the inclined conveyer, which carries the same upwardly, and to the extent that the carcasses move upon the conveyer, more or less of the hair is removed from the carcasses during the upward travel. The carcasses are discharged over the drum 16, at the upper end of the conveyer over the scraper shaft 24, and scrapers thereon, to the scraping drum 9, and are carried thereby against the scrapers on the shaft 35, which act oppositely upon the carcasses from the scraping drum 9, and insure the carcasses being turned transversely the machine with the head and rump supported at the raised portions of the drum. The carcasses are constantly and rapidly rotated by the coaction of said scraping elements, and when, in the judgment of the operator, the scraping operation is completed, the operator brings the lever 13, downwardly, thereby elevating the scraping shaft 38, sufficiently to permit the carcasses to be ejected by the scraping drum 9, onto the table at the rear end of the machine. During the entire operation, the scraping drum (the lower portion of the periphery of which extends below the surface of the water in the tank) has acted to dash the water from the tank constantly over the carcasses, laving the same with hot water during the scraping operation and insuring the thorough scraping and cleansing of the carcasses. Any hair or material removed from the carcasses, falls upon the floor 6, and the scraping blades carry the same forwardly and deposit the same in the receptacle 45, before described, whence such refuse slides to the discharge aperture X, and from the machine.

Of course, it is to be understood that the particular construction of the scraping elements may vary through a wide range, as may also the particular drive therefor, and it is to be understood that I have shown but a preferred embodiment of my invention, and I therefore do not purpose limiting the patent granted on this application, otherwise than necessitated by the prior art.

I claim as my invention:

1. A device of the class described embracing a scalding tank, a hog dehairing machine supported thereon, scraping mechanism therein for the carcasses, and a submerged collecting receptacle within the tank for receiving the hair and other refuse and discharging the same.

2. A device of the class described embracing a scalding tank, a hog scraping machine mounted thereon to receive the carcasses directly therefrom, mechanism associated with said machine for dashing the water from the tank over the carcasses while scraping the same, and a receptacle submerged in the tank for collecting the hair and refuse as removed from the carcasses and acting to prevent the distribution thereof through the water of the tank.

3. A machine of the class described embracing a scalding tank, a rotative scaping drum thereon, means delivering the carcasses upon the drum, scraping means acting to retain the carcasses temporarily upon the drum and coacting therewith to rotate the carcasses, and means collecting the refuse from the carcasses as removed by the scrapers and retaining the same from distribution through the water of the tank, the scraping drum acting to move said refuse into said collecting means.

4. A device of the class described embracing coacting scraping elements, a scalding tank above which the same are supported, and a tight receptacle in said tank to which said elements act automatically in discharging the refuse scraped from the carcasses, said receptacle having a normally open lateral discharge port, through which the refuse is discharged from the machine.

5. In a device of the class described, a tank, conveying mechanism therein, said mechanism inclined upwardly toward its discharge end, a plurality of scraping mechanisms, one of which is partially submerged and disposed below the discharge end of said conveying mechanism, a perforated floor beneath said partially submerged scraping mechanism adapted to catch the hair scraped from a carcass and permitting water to drain therethrough, and a receptacle adapted to receive the hair and refuse scraped from the carcass from said perforated floor.

6. In a device of the class described an inclined conveyer for carcasses, a plurality of scraping mechanisms disposed below the discharge end thereof, one of said scraping mechanisms adjustably mounted and adapted to be swung out of the field of operation, retaining means to catch the hair scraped from the carcass, a receptacle adapted to receive the hair scraped from the carcass from said retaining means and means whereby the hair is moved along said retaining means into said receptacle by certain of said scraping means.

7. In a device of the class described a conveyer, a plurality of independently rotative scraping mechanisms disposed below the discharge end thereof, adapting a carcass to be passed over said scraping mechanisms and supported thereon, and power driven scraping means adjustably mounted to retain the carcass in the field of operation and adapted to be swung upwardly out of the field of operation to permit discharge of the carcass from said scraping mechanisms.

8. In a device of the class described a tank, a conveyer therein, a plurality of scraping mechanisms disposed below the discharge end thereof within said tank, certain of said scraping mechanisms adapted to receive a carcass supported thereon to rotate, support and dehair the same, means to catch the hair scraped from the carcass, and a receptacle adapted to receive the hair from said means and to pass said hair outwardly at the side of the machine.

9. In a device of the class described a water tank, mechanism partially submerged for elevating a carcass, partially submerged scraping means adapted to receive a carcass thereon from said elevating mechanism to rotate and dehair the carcass, certain of said scraping mechanisms adjustable to retain the carcass in the field of operation and when adjusted to permit discharge of the carcass, means catching the hair and refuse scraped from the carcass, and a submerged sealed receptacle open at its upper end adapted to receive said hair from said means.

10. In a device of the class described a plurality of scraping mechanisms for a carcass, means mounted adjacent thereto to receive the hair scraped from the carcasses and to drain the same of water, a receptacle to receive the hair from said draining means, certain of said scraping mechanisms disposed so as to move the hair from said draining means into the receptacle, and mechanism permitting discharge of the carcass after the same has been scraped.

11. In a device of the class described coacting scraping mechanisms for dehairing a carcass, certain of said mechanisms of spool shape to support a carcass being scraped in the field of operation, and other of said mechanisms adjustable to permit discharge of the carcass therefrom.

12. In a device of the class described a tank, a plurality of scraping mechanisms, certain of said mechanisms partially submerged and disposed to rotate beneath a carcass to dehair the same while supporting the carcass, the other of said mechanisms assisting to dehair the carcass while maintaining the same on said supporting mechanism, and means permitting discharge of the carcass from the device by said first mentioned mechanism.

13. In a hog scraping machine of the class described a tank, an inclined conveyer partially submerged therein, scraping mechanisms disposed below the discharge end of said conveyer adapted to receive a carcass thereon from said conveyer, certain of said scraping mechanisms partially submerged to dash water upon the carcass operated upon, other of said scraping mechanisms adjustable to permit discharge of the carcass from the field of operation after dehairing of the same, and a receptacle for the collection of hair and refuse from the carcass moved into said receptacle by certain of said scraping mechanisms.

14. In a hog scraping machine of the class described a tank, an inclined partially submerged conveyer therein, a downwardly inclined upwardly perforated floor mounted beneath the discharge end of the conveyer, scraping mechanisms disposed thereover to receive a carcass thereon discharged from said conveyer, said perforated floor permitting a circulation of water therethrough and acting to catch the hair and refuse scraped from a carcass, a sealed receptacle communicating through an opening in said perforated floor to receive the hair and refuse conveyed thereinto and acting to discharge the same at the side of the tank, and scraping mechanisms adjustable to permit discharge of the carcass from the tank after the same has been sufficiently operated upon.

15. In a device of the class described a tank, an inclined conveyer therein, an inclined floor disposed beneath the discharge end of said conveyer, scraping mechanisms mounted thereover to receive a carcass thereon from said conveyer, said floor acting to receive the hair and refuse scraped from the carcass, a receptacle communicating through an opening in the floor to receive the hair and refuse therefrom and convey the same through an opening in the side of the tank, and means permitting discharge of the carcass from the tank by said mechanisms after the same has been sufficiently operated upon.

16. In a device of the class described a tank containing water, a conveyer therein, scraping mechanisms disposed at the discharge end of said conveyer, a perforated floor beneath said scraping mechanism permitting a circulation of water therethrough and acting to collect the hair and refuse scraped from a carcass operated upon, a receptacle communicating through an opening in said floor adapted to receive the hair and refuse therefrom, and means adjustably mounted to permit discharge of a carcass after the same has been sufficiently operated upon by said scraping mechanisms.

17. In a device of the class described, an inclined conveyer, rotatable beaters disposed below the discharge end thereof, a rotatable dehairing drum adapted to receive the carcass thereon while operated on by said beaters, and swingingly mounted beaters mounted at the other side of said drum and slightly above the same co-acting therewith to dehair the carcass and permitting discharge of the carcass by said drum when swung upwardly therefrom.

18. In a device of the class described, a tank, an inclined conveyer submerged at its lower end in said tank, rotatable beaters disposed below the upper discharge end of said conveyer, a rotatable drum to receive a carcass discharged thereon from said conveyer and disposed below said beaters, swingingly mounted counterweighted arms mounted in said tank above said drum and conveyer, and rotatable beaters mounted on said arms to operate on a carcass on said drum permitting discharge of said carcass by said drum when said second mentioned beaters are swung upwardly therefrom.

19. In a device of the class described, a tank, an inclined conveyer mounted therein, a rotatable scraping drum adapted to receive a carcass discharged thereon by said conveyer, swingingly mounted beaters rotatably mounted at one side and above said drum and when swung upwardly therefrom permitting discharge of the carcass by the drum.

In testimony whereof I have hereunto subscribed my name in the presence of two subscribing witnesses.

JOHN W. KOHLHEPP.

Witnesses:
CHARLES W. HILLS, Jr.,
GEORGE R. MOORE.